United States Patent [19]

Wang

[11] 4,404,470
[45] Sep. 13, 1983

[54] NEUTRON STREAK CAMERA

[75] Inventor: Ching L. Wang, Livermore, Calif.,

[73] Assignee: The United States of America as represented by the U.S. Department of Energy, Washington, D.C.

[21] Appl. No.: 263,649

[22] Filed: May 14, 1981

[51] Int. Cl.³ .............................................. G01T 3/00
[52] U.S. Cl. .................................................. 250/390
[58] Field of Search ............... 250/374, 336, 385, 390, 250/391, 392; 376/254, 255

[56] References Cited

U.S. PATENT DOCUMENTS

| | | |
|---|---|---|
| 2,767,324 | 10/1956 | Van de Graaf. |
| 3,140,398 | 7/1964 | Reinhardt et al. |
| 3,163,759 | 12/1964 | Cordy et al. |
| 3,398,278 | 8/1968 | Splichal, Jr. |
| 3,805,078 | 4/1974 | Kozlov ................................ 250/390 |
| 3,898,466 | 8/1975 | Kawashima ......................... 250/390 |
| 4,008,399 | 2/1977 | Brown ................................. 250/390 |
| 4,071,764 | 1/1978 | Thurlow .............................. 250/390 |
| 4,086,490 | 4/1978 | Todt, Jr. .............................. 250/385 |
| 4,090,083 | 5/1978 | Wyvill ................................. 250/390 |
| 4,180,736 | 12/1979 | Goodman ............................ 250/390 |

OTHER PUBLICATIONS

Daum, "Electron Multiplier Neutron Detectors", *IRE Transactions on Nuclar Science*, Aug. 1958, pp. 30-32.
Jamerson et al., "Secondary Electron Yield from Fission Fragments", *J. of App. Physics*, vol. 36, No. 2, Feb. 1965, 355-356.
McConagy et al., "Picosecond X-Ray Streak Camera", *Applied Physics Letters*, vol. 25, No. 5, Sep. 1, 1974, 268-270.

*Primary Examiner*—Janice A. Howell
*Attorney, Agent, or Firm*—Patrick T. King; Clifton E. Clouse, Jr.; Richard G. Besha

[57] ABSTRACT

Apparatus for improved sensitivity and time resolution of a neutron measurement. The detector is provided with an electrode assembly having a neutron sensitive cathode which emits relatively low energy secondary electrons. The neutron sensitive cathode has a large surface area which provides increased sensitivity by intercepting a greater number of neutrons. The cathode is also curved to compensate for differences in transit time of the neutrons emanating from the point source. The slower speeds of the secondary electrons emitted from a certain portion of the cathode are matched to the transit times of the neutrons impinging thereupon.

7 Claims, 4 Drawing Figures

NEUTRON STREAK CAMERA

The U.S. Government has rights in this invention pursuant to Contract No. U-7405-ENG-48 between the U.S. Department of Energy and the University of California.

BACKGROUND OF THE INVENTION

1. Field of the Invention

This invention relates to apparatus for detection and display of neutrons and, more particularly, to apparatus for improving the sensitivity and temporal resolution of neutron detectors.

2. Prior Art

The temporal distribution of neutrons emanating from point sources, such as an inertial confinement fusion targets used in fusion reactors, is difficult to accurately measure due to the very short time duration of the fusion reaction. Meaningful measurements for analysis of a burn history must be made on a neutron flux which has a temporal duration of about 100 picoseconds. Obviously, measurement apparatus which either is not fast enough to follow variations in the neutron flux or which introduces large temporal dispersion into the measurement data is not useful. Conventional detectors and measurement schemes are not fast enough, nor can they adequately resolve the temporal variations in the neutron flux over such a short time period.

In related areas of technology, measurements of very short-duration light and x-ray pulses of large flux magnitude have been made using very fast photodetectors. The output of these fast photodetectors feeds an x-ray streak camera, which is capable of resolving time differences on the order of 10 picoseconds or less. A typical x-ray streak camera provides a continuous exposure for a very short time interval and achieves good time resolution by rapidly changing the position, or streaking, the image on the recording surface, which may be film or a phosphor screen. The image is rapidly moved over the recording surface by using either a rapidly rotating mirror or deflection plates. X-ray streak cameras have been previously used for measurement of light or x-ray fluxes of relatively large magnitude. For x-ray measurements of large flux magnitude, the x-rays are collimated through a small slit. Because of the relatively low density of neutron fluxes provided from inertial confinement targets, slits are not practical for collimating a neutron flux.

Various types of neutron flux detectors are known in the prior art which utilize secondary emission of electrons dragged by fission fragments from materials such as uranium dioxide. These secondary electrons are measured using diodes which are not fast enough to resolve 100-picosecond variations in neutron fluxes. To obtain good time resolution, prior art neutron flux detectors using secondary electron emission were small flat plates with relatively small areas for intercepting neutrons. Consequently, they had low detection sensitivity and were found to be unsuitable for application such as measurement of neutrons released in inertial confinement fusion reactions. Even if these prior art detector plates were increased in size, neutrons simultaneously emanating from a point source would have different arrival times. Neutrons which are off-axis will arrive at these targets at a time later than neutrons which are on-axis. Merely increasing the area of these targets thus would result in overlapping of neutron flux information and reduction in the time-resolving ability of a neutron detection system.

SUMMARY OF THE INVENTION

It is, therefore, an object of the invention to provide improved measurements of neutron fluxes emanating from point sources.

It is another object of this invention to provide apparatus and a method for improving the sensitivity of neutron flux measurements.

It is another object of this invention to provide improved time resolution for neutron flux measurements.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with these and other objects of the invention, an improved streak camera electrode assembly is provided which receives a neutron flux from a point source and which provides secondary electrons from a cathode of neutron-sensitive material. The electrons are slower than the neutrons. If an axis is defined extending from the point source of neutrons to the cathode, certain ones of the neutrons will travel to the cathode at an angle with respect to the axis and, consequently, have longer transit times. To compensate for the differences in transit times of neutrons from the point source, the cathode is curved so that the transit times of slower secondary electrons emitted by the cathode compensate for the differences in arrival times of the neutrons. The electrode assembly also includes an anode adapted to drawing the secondary electrons from the cathode.

BRIEF DESCRIPTION OF THE DRAWINGS

The accompanying drawings, which are incorporated and form a part of the specification, illustrate an embodiment of the invention and, together with the description, serve to explain the principles of the invention.

In the drawings.

DETAILED DESCRIPTION OF THE PREFERRED EMBODIMENT

Figure 1:
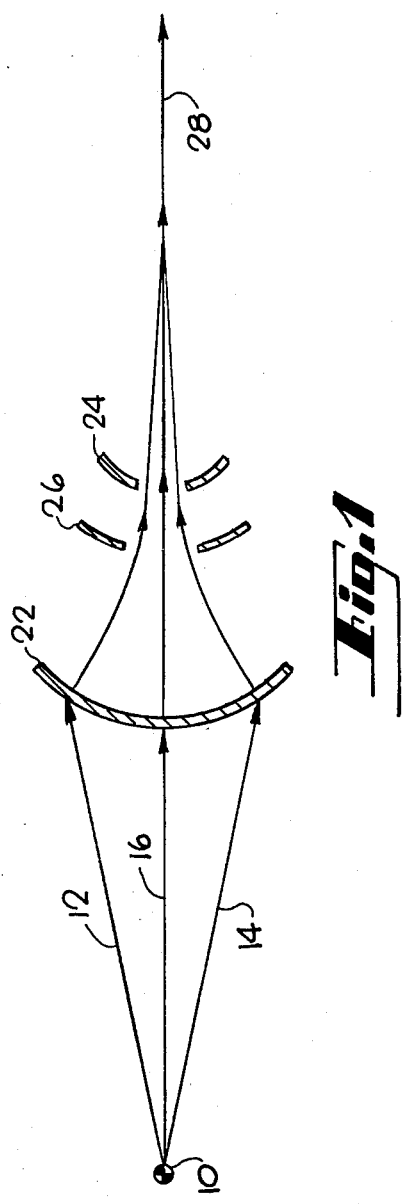
FIG. 1 is a schematic view (not to scale) of a neutron streak camera electrode assembly, according to the invention.

Referring now to FIG. 1 of the drawings, a point source 10 of neutrons originates, for example, from a very small inertial confinement fusion target containing hydrogenic fusion materials such as deuterium and tritiuum which, under certain conditions, fuse to produce helium and 14 MeV neutrons. The fusion reaction is initiated by the target being irradiated by finely focused high-energy beams of laser light, ions, etc. The target implodes and maintains the deuterium and tritium at sufficient temperature and pressure for a sufficient time to initiate a fusion reaction. The trajectory lines 12,14 represent the paths of neutrons which emanate from the point source 10 and which diverge from a trajectory line 16 coincident with a line defining the axis of an electrode assembly 20.

The electrode assembly 20 includes a cathode 22 formed as a thin curved sheet of neutron-sensitive material, such as uranium dioxide. The cathode 22 curves away from the source, as explained hereinbelow, to compensate for differences in the times-of-flight of neutrons simultaneously emitted from the point source 10. Assuming constant velocity, the neutrons arrive at the cathode 22 at different times due to variations in the length of their paths, as indicated by the trajectory lines. Even though the 14 MeV neutrons may be simultaneously produced at the point source, they arrive at different times at the cathode. Since the fusion of the deuterium and the tritium in the target occurs within approximately a hundred picoseconds, differential transit time delays must be resolved to within tens of picoseconds to provide resolvable, useful information about the burn history of the fusion reaction. Because the quantity of 14 MeV neutrons is relatively low, the area of the cathode 22 should be as large as possible to intercept a large number of neutrons.

Figure 3:
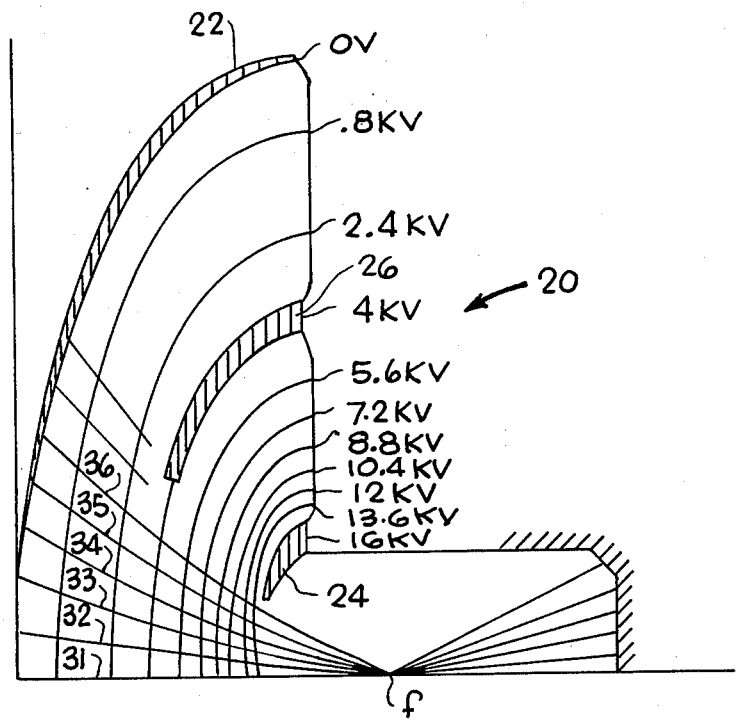
FIG. 3 is a partial, cross sectional view of a neutron streak camera electrode assembly, according to the invention.

FIG. 3 is a cross sectional view of the electrode assembly 20. The cathode 22 is made of neutron-sensitive material such as uranium dioxide. Upon being struck by a 14 MeV neutron, the cathode reacts and produces fission products, and several hundred relatively low-energy electrons, that is, electrons with energies less than 20 eV. These electrons are accelerated by an anode electrode 24 which is maintained, for example, at an electrical potential of 16 thousand volts with respect to the cathode 22. An extractor electrode 26 is positioned between the cathode 22 and the anode 24 and has an electric potential of 4,000 volts with respect to the cathode 22 impressed thereupon. The extractor 26 shapes the electric field set up between the cathode and the anode. FIG. 3 also shows equipotential electric field lines between the elements 22,24,26 of the electrode assembly 20. Electrons emitted from the cathode 22 are accelerated along path lines typically shown as 31-36 toward the anode 24 and focused into an electron beam 28.

Figure 2:
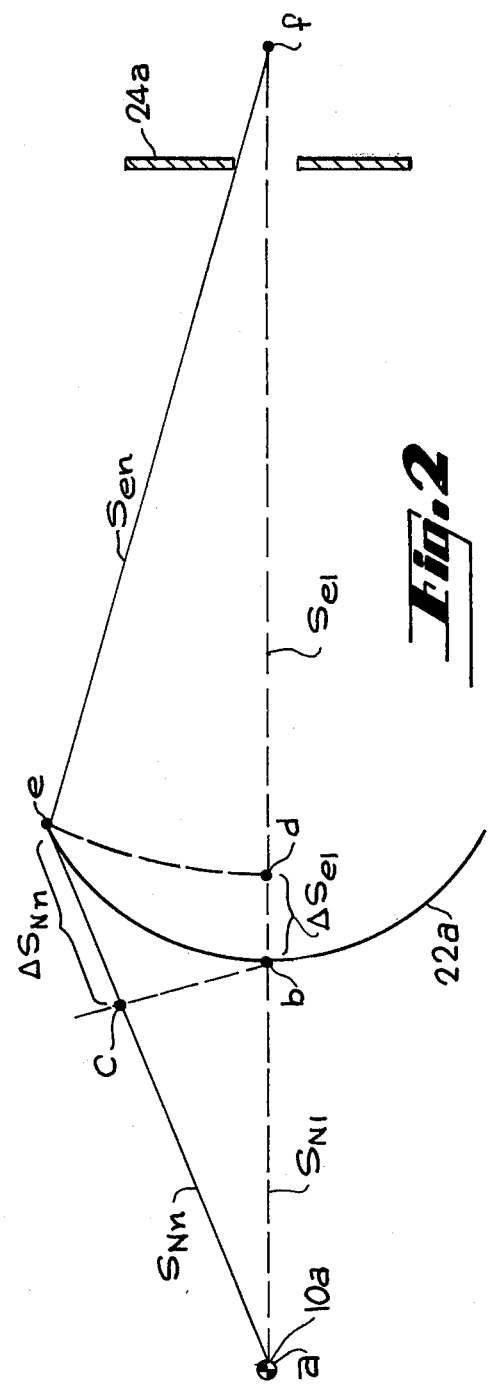
FIG. 2 is a diagram indicating the manner in which the cathode assembly compensates for neutron delay times with electron delay times.

Referring now to FIGS. 1 and 2, the electron beam 28 is produced to provide information corresponding to the number and temporal distribution of neutrons emanating from the pont source 10. The electron beam should then be optimized for precise measurement of the fusion reaction history. It is desireable, for example, that the electron beam be capable of accurately indicating small variations in neutron flux; that is, provide good measurement sensitivity. For improved sensitivity, it is desireable that the area of the cathode 22 be as large as possible in order to intercept the maximum number of neutrons emanating from the point source 10. The cathode 22 has a large area to improve sensitivity.

While sensitivity is improved by increasing the area of the cathode 22, merely making the cathode area larger would cause a larger number of neutrons to be detected with a corresponding increase in temporal dispersion due to variations in transit times. The temporal dispersion of the electrons collected to form the electron beam 28 is minimized if the electrons forming any single portion of the electron beam 28 are produced only by neutrons emanating from the point source 10 at one instant of time, providing unambiguous time resolution. The cathode 22 is curved away from the source 10, as indicated, to improve temporal resolution.

FIG. 2 diagrammatically illustrates how an axially symmetric cathode 22a is curved to provide improved sensitivity and time resolution. A point source of neutrons 10a is located at point a. The axially symmetric neutron-sensitive cathode 22a located at b is formed, for example, as a spherical segment with its center located along a line segment, a-f, defining an axis. Secondary electrons are emitted from the cathode 22a and accelerated towards an anode 24a, where they converge at a crossover, or focal, point at f.

The neutron-path distances are defined as follows: $S_{Nl}$ (represented by line segment ab) is the minimum distance traveled by any neutron from the neutron source 10a to the cathode 22a and corresponds to the axial trajectory line 16 of FIG. 1. $S_{Nn}$ (represented by line segment ae) is the distance traveled by a typical off-axis neutron from the source 10a to the cathode 22a. $\Delta S_{Nn}$ (represented by line segment ce) is the difference between distances $S_{Nl}$ and $S_{Nn}$.

The electron-path distances are defined as follows: $S_{el}$ (represented by line segment bf) is the distance traveled by an on-axis electron from the cathode 22a to a focal point f located near an anode 24a. $S_{en}$ (represented by line segment ef) is the distance traveled by a typical off-axis electron from the cathode 22a to the focal point f. $\Delta S_{el}$ is the differential distance between distances $S_{el}$ and $S_{en}$.

The velocities, $B_n$, of the 14 MeV neutrons are much greater than the velocities, $B_e$, of the secondary electrons. The velocity of the neutrons $B_n$ times the off-axis differential transit time $\Delta t_{Nn}$ equals the differential path length $\Delta S_{Nn}$ represented by line segment ce; and the velocity of the electrons $B_e$ times the on-axis differential electron transit time $\Delta t_{el}$ equals the differential electron path length $\Delta S_{el}$ represented by line segment bd. A basic understanding of the transit time compensation afforded by the geometrical shape of the cathode 22a can be obtained by observation of FIG. 2. The delay time $\Delta t_{Nn}$ of an off-axis neutron can be offset by the delay time $\Delta t_{el}$ of the on-axis electrons when the differential distances $\Delta S_{Nn}$ and $\Delta S_{el}$ are in the same ratio as the respective neutron and electron velocities, $B_n$ and $B_e$. For a given geometry, calculations of neutron and electron transit times using, for example, electron beam optics computer codes are required.

A specific example of a compensated electrode assembly for an electrode assembly with a geometry as shown in FIG. 3 is tabulated in Tables I, II, and III for six representative cases for electron paths 31–36. The assembly has the following parameters: a minimum distance traveled by a neutron, $S_{Nl} = 30$ cm; a cathode with a radius of 2.5 cm; a neutron velocity of $0.51 \times 10^{10}$ cm/sec; an on-axis electron time delay $t_{Nl}$ of 6000 picoseconds; and a cathode to anode voltage of 16 thousand volts.

TABLE I

| | Differential Transit Time for Neutrons | |
|---|---|---|
| Path # | $\Delta S_{Nn} = S_{Nn} - S_{Nl}$ (cm) | $\Delta t_{Nn} = t_{Nn} - t_{Nl}$ (ps) |
| 31 | 0 | 0 |
| 32 | .01 | 2 |
| 33 | .03 | 6 |

TABLE I-continued

Differential Transit Time for Neutrons

| Path # | $\Delta S_{Nn} = S_{Nn} - S_{Nl}$ (cm) | $\Delta t_{Nn} = t_{Nn} - t_{Nl}$ (ps) |
|---|---|---|
| 34 | .09 | 18 |
| 35 | .5 | 30 |
| 36 | .23 | 46 |

TABLE II

Differential Transit Time for Electrons

| Path # | $t_{en}$ | $\Delta t_{en}$ |
|---|---|---|
| 31 | 1049 ps | 0 ps |
| 32 | 1053 | 4 |
| 33 | 1047 | −2 |
| 34 | 1037 | −12 |
| 35 | 1023 | −26 |
| 36 | 1000 | −49 |

TABLE III

Neutron and Electron Transit Time Comparisons

| Path # | $\Delta t_{Nn}$ | $\Delta t_{en}$ | $\Delta t_f = \Delta t_{Nn} + \Delta t_{en}$ | $T_n$ |
|---|---|---|---|---|
| 31 | 0 ps | 0 ps | 0 ps | 7109 ps |
| 32 | 2 | 4 | 6 | 7115 |
| 33 | 6 | −2 | 4 | 7113 |
| 34 | 18 | −12 | 6 | 7115 |
| 35 | 30 | −26 | 4 | 7113 |
| 36 | 46 | −49 | −3 | 7106 |

The maximum differential time delay is 9 ps (picoseconds) which is the maximum difference between rays 32 and 36 in the differential time delay $\Delta t_f$ column in Table III.

Additional time delays are caused by the distribution of energy of electrons within the cathode and by the thickness of the cathode. The fissionable portion of the cathode should be as thin as possible, a preferred thickness being one micrometer.

Figure 4:
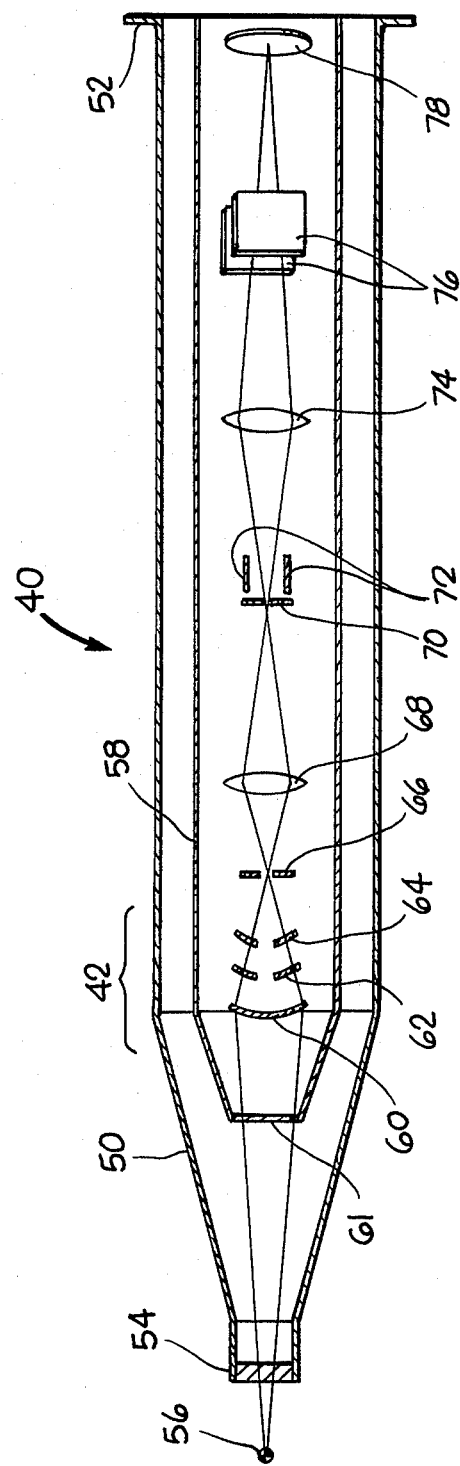
FIG. 4 is a partial cross sectional diagrammatic view of a neutron streak camera assembly utilizing the electrode assembly according to the invention.

Referring to FIG. 4, a neutron streak camera 40 is shown which incorporates an electrode assembly 42 similar to the electrode assembly 20 of FIG. 3. A tubular reentry vessel 50 has a flanged portion 52 at one end for attachment to a vacuum vessel of, for example, an inertial confinement fusion device. The other end of the reentry vessel 50 is tapered down and terminates in a tungsten plug which functions as an x-ray shield 54 and which passes neutrons from a point source 56, such as a fusion inertial confinement target. A glass, or aluminum, vacuum tube 58 is positioned within the re-entry vessel 50 and contains the components for the neutron streak camera 40.

A thin curved cathode 60, similar to the cathode 22 of FIG. 3, is formed of a fissionable material and is positioned near one end 61 of the vacuum tube 58 for receiving 14 MeV neutrons from the neutron source 56. An extractor electrode 62 and anode 64 are positioned adjacent the concave side of the cathode 60 to provide an electrostatic acceleration and focusing field for low energy secondary electrons produced by 14 MeV neutron bombardment of the cathode 60 and converging at a crossover print near the 0.2 mm diameter aperture of a first collimating slit electrode 66. The electrons pass through a first electrostatic lens 68 and a second collimating electrode 70 before being vertically deflected by a first pair 72 of electrostatic deflection plates. The electrons then pass through a second electrostatic lens 74 and are horizontally deflected by a second pair 76 of electrostatic deflection plates. The electrons finally strike a target, such as a phosphor screen 78 located near the other end of the vacuum tube 58. The first and second pairs 72,76 of deflection plates deflect the electrons to sweep them across the phosphor screen 78. The light emitted by the phosphor screen 78 is then, for example, lens coupled to a photographic film for recording an image indicative of the neutron flux emitted by the neutron source 56 as a function of time.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A neutron streak camera electrode assembly for receiving neutrons from a point source of neutrons and providing secondary electrons indicative of said neutrons, comprising:
   a cathode of neutron-sensitive material which emits slower secondary electrons when struck by neutrons from the point source, said cathode having a curved configuration and positioned along an axis with respect to said point source, the cathode being curved so that differences between the arrival times of neutrons, simultaneously emanating from the point source of neutrons but arriving at different times at the cathode, are compensated for by the transit times of the secondary electrons which are emitted from said curved cathode for each neutron striking the cathode;
   an anode having a voltage impressed thereupon for accelerating the secondary electrons emitted by the cathode.

2. An assembly of claim 1 including an extractor electrode positioned between the neutron cathode and the anode for shaping the electric field between the neutron cathode and the anode.

3. The assembly of claim 1 wherein the neutron cathode includes a uranium oxide material which emits lower energy secondary electrons when bombarded with high-energy neutrons.

4. The assembly of claim 1 including means for streak recording images indicative of the electrons emitted from the cathode as a function of time.

5. The assembly of claim 1 wherein the cathode is curved to extend away from the point source so that electrons produced by neutrons simultaneously emanating from the point source arrive at the anode at approximately the same time.

6. The assembly of claim 1 wherein the cathode of neutron-sensitive material is formed as a relatively thin axisymmetric member.

7. The assembly of claim 1 including a phosphor screen and a pair of deflection plates for deflecting the secondary electrons with respect to said phosphor screen so that a streak display of the neutrons is provided as a function of time.

* * * * *